W. V. YANDELL.
TOWER WAGON.
APPLICATION FILED NOV. 21, 1910.

1,091,419.

Patented Mar. 24, 1914.
4 SHEETS—SHEET 1.

Witnesses
Fenton S. Belt
E. Edmonston Jr.

Inventor
William V. Yandell
By Victor J. Evans
Attorney

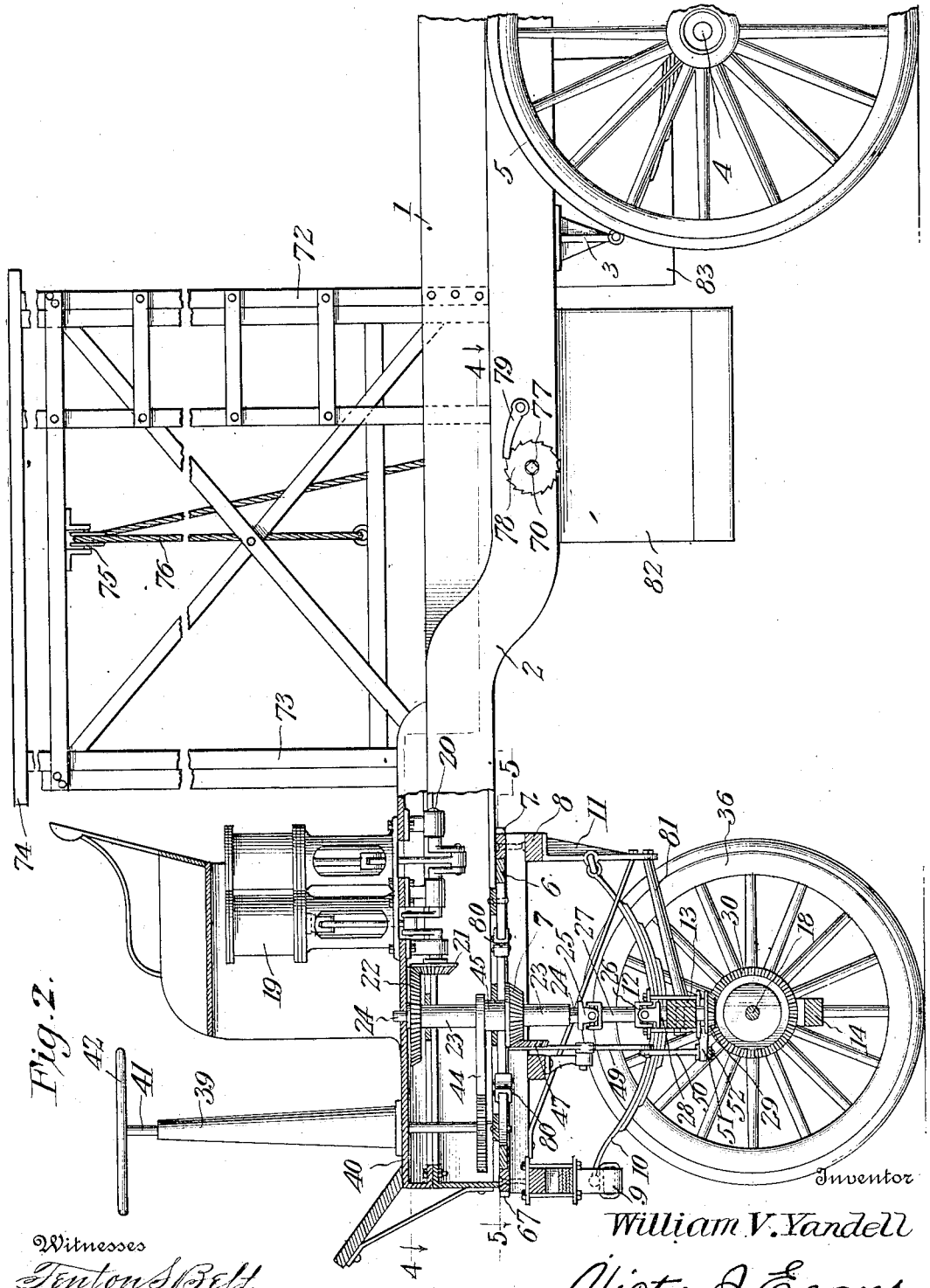

W. V. YANDELL.
TOWER WAGON.
APPLICATION FILED NOV. 21, 1910.

1,091,419.

Patented Mar. 24, 1914.
4 SHEETS—SHEET 3.

Witnesses
Fenton S Bell
F. Edmonston Jr.

Inventor
William V. Yandell
By Victor J. Evans
Attorney

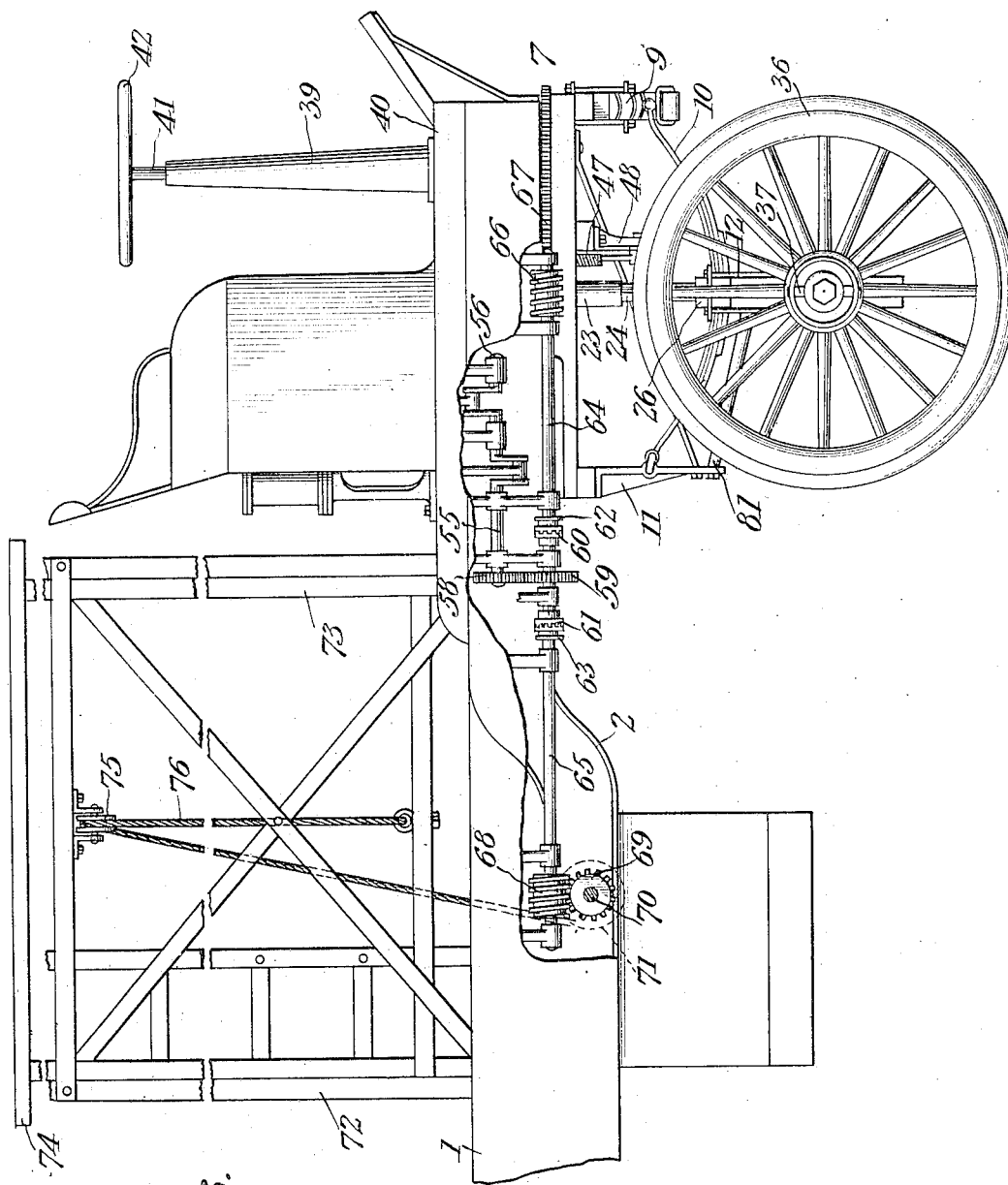

UNITED STATES PATENT OFFICE.

WILLIAM V. YANDELL, OF LOS ANGELES, CALIFORNIA.

TOWER-WAGON.

1,091,419.　　　　　Specification of Letters Patent.　　Patented Mar. 24, 1914.

Application filed November 21, 1910.　Serial No. 593,485.

*To all whom it may concern:*

Be it known that I, WILLIAM V. YANDELL, a citizen of the United States, residing at Los Angeles, in the county of Los Angeles and State of California, have invented new and useful Improvements in Tower-Wagons, of which the following is a specification.

This invention relates to driving and steering mechanism for motor trucks and particularly for emergency tower wagons for street railway work.

The object of the invention is the provision of mechanism for driving and steering a vehicle of this character whereby the vehicle may be turned in the shortest possible space.

A further object of the invention is the provision of a front driving mechanism for wagons of this character which will permit the mounting of the motor upon the truck body and which provides a flexible connection between the motor and the driving axle so that the vehicle may be spring mounted.

A further object of the invention is the provision of means for steering the vehicle by power and independent means for steering the vehicle by hand and the above object is accomplished by providing a pivoted truck which is operated by power and pivoting the wheels upon the truck so that they may be operated independently thereof by hand.

A still further object of the invention is the provision of an auxiliary motor carried upon the body of the vehicle which may be utilized for steering the vehicle or for raising and lowering the tower.

Figure 1:
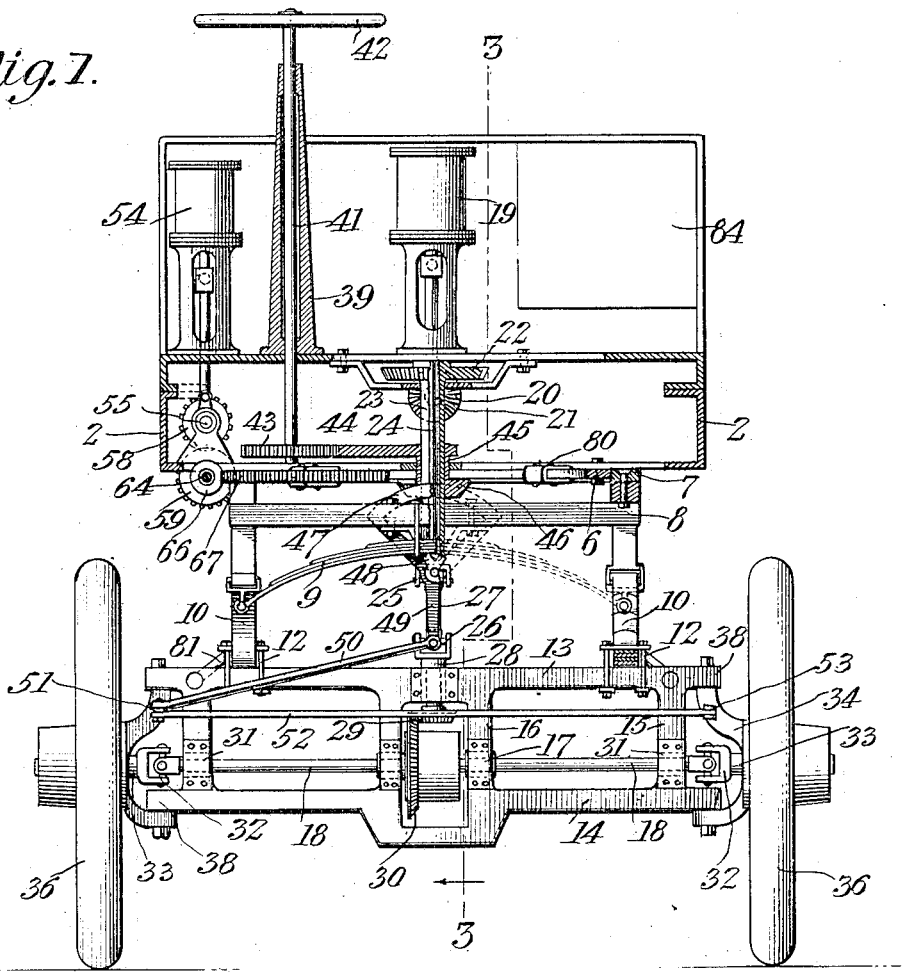
Figure 6:
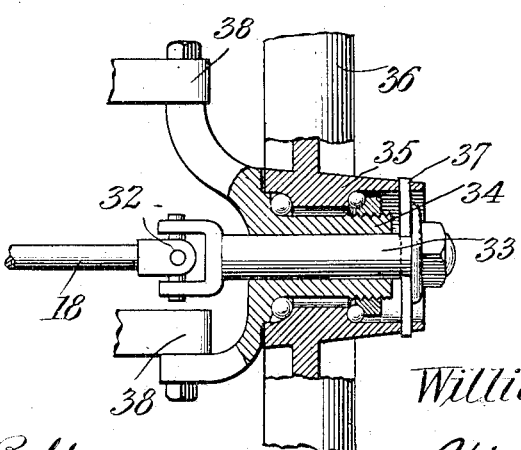
Figure 3:
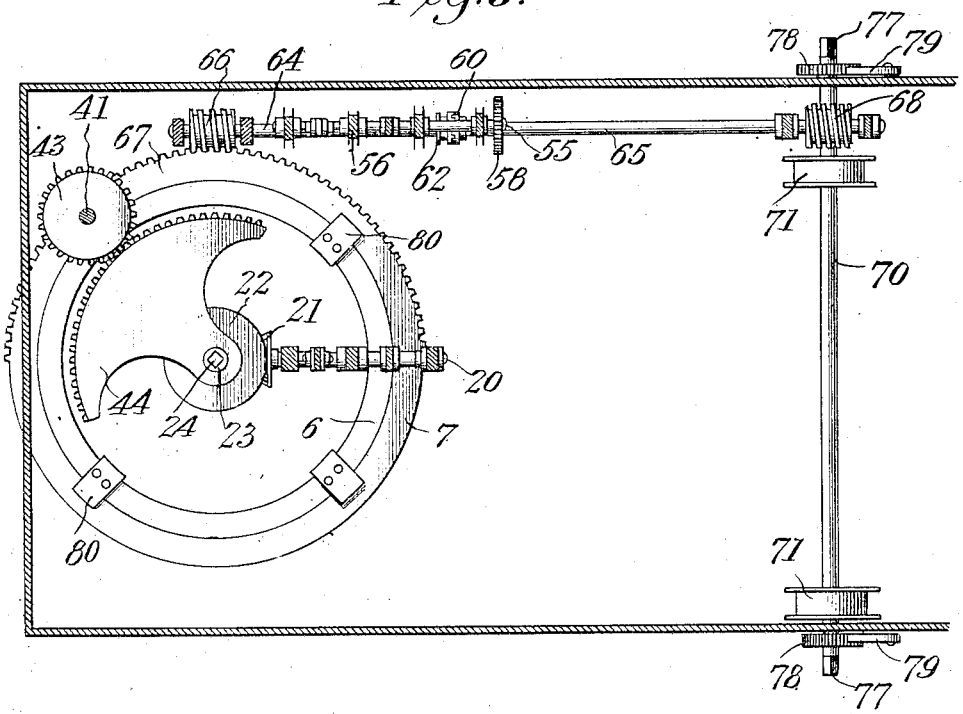
Figure 4:
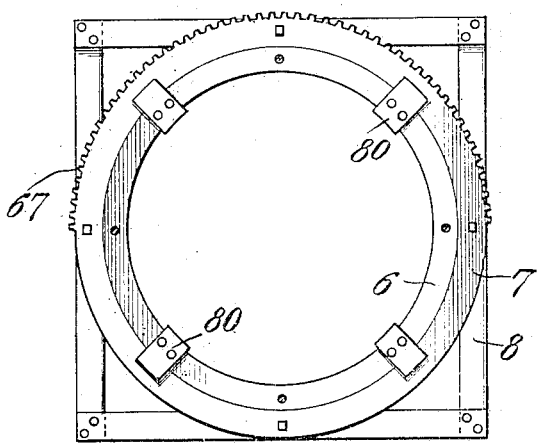

Further objects of the invention will appear as the following specific description is read in connection with the accompanying drawings which form a part of this application, and in which:

Figure 1 is a vertical transverse section. Fig. 2 is a longitudinal section on the line 3—3 of Fig. 2. Fig. 3 is a detail horizontal section on the line 4—4 of Fig. 1. Fig. 4 is a similar section on the line 5—5 of Fig. 1. Fig. 5 is a detail side elevation taken oppositely from Fig. 1 and with parts broken away. Fig. 6 is a detail sectional view through one of the wheel hubs.

Referring more particularly to the drawing 1 represents the bed of the vehicle which is supported upon channel iron sills 2 having depending therefrom the spring brackets 3 upon which the rear supporting axle 4 is carried in the usual manner. The usual wheels 5 are of course mounted upon the axle so as to support the rear end of the wagon. The forepart of the wagon is slightly raised and has secured to its underneath side one member 6 of a fifth wheel whose opposite member 7 is secured to the front wheel truck 8 which has the semi-elliptic springs 9 secured to the front thereof and the springs 10 secured to the springs 9 and to a pair of depending arms 11 carried by the rear of the truck. The axle which is connected to the springs by the clip bolts 12 is shown to be constructed of parallel bars 13 and 14 connected together by bridge pieces 15 and 16 the latter being arranged in the center of the bars and supporting suitable bearings 17 for the spindle shaft 18.

The driving motor herein illustrated has a steam engine as shown at 19 mounted upon the forward end of the bed and connected to operate the crank shaft 20 which is geared to a vertical driving shaft by means of bevel gearing 21 which is in mesh with a similar gear 22 carried upon a sleeve 23 which surrounds the driving shaft 24. The driving shaft may be either splined in the sleeve or square so that it is adapted to rotate with the sleeve but is permitted to slide therein to accommodate the action of the springs as will hereinafter be described. The driving shaft 24 extends down through the sleeve and is connected at its lower end to a universal joint 25 which is in turn connected to a similar universal joint 26 through a link 27 thereby flexibly joining the driving shaft and the differential stub shaft 28 which is provided on its lower end with a gear 29 in mesh with the gearing 30 secured to the inner ends of the spindle shafts 18.

As before stated the spindle shafts 18 are mounted in bearings 17 in the bridge pieces 16 and these shafts are further journaled in bearings 31 carried by the bridge pieces 15 and are connected at their outer ends to universal joints 32 which connect the shaft spindles 33. The spindles 33 pass freely through the hollow steering spindles 34 and are connected to the hubs 35 of the wheels 36 by means of cross pins 37 so that the wheels are driven around the hollow spindles 34 and the universal joints 32 provide for the pivoting of the hollow spindles upon the horizontal extensions 38 of the axle.

In order to turn the spindles 34 in the extensions and thereby steer the vehicle by turning the wheels, a steering post 39 is mounted upon the raised foot board 40 and has passing therethrough a steering rod or shaft 41 upon the upper end of which is mounted the usual steering wheel 42. The lower end of the steering rod or shaft is stepped in a bearing carried by the bed plate and has secured immmediately thereabove a gear 43 which is in mesh with a segment 44 secured to a sleeve 45 mounted to rotate upon the sleeve 23. This sleeve extends downwardly past the lower member 7 of the fifth wheel and has secured thereto a bevel gear 46 which is in mesh with a vertically disposed segment 47 pivoted upon a bracket 48 depending from the bed plate. The segment has a depending extension 49 which is connected to a shifter rod 50 whose outer end is in turn connected to a lateral arm 51 carried by the right hand steering spindle 34. The steering spindles are interconnected by a rod 52 which connects the arm 51 with a similar arm 53 on the opposite steering spindle. By rotating the steering shaft 41 in either direction the sector 44 is moved in one direction or the other thus turning the sleeve 45 and the gear 46 which operates upon the segment 47 and oscillates the extension 49 which being in connection with the shifter rod 50, moves the wheels to the right or left according to the movement of the steering shaft.

Mounted upon the bed on the opposite side of the truck from the main driving engine is an auxiliary steering and tower operating engine 54 which is connected to drive a crank shaft 55 journaled in the bearing 56 upon the bed plate and having connection with the steering and tower raising shaft 57 through the gears 58 and 59. This steering and driving shaft has clutch members 60 and 61 mounted on its opposite ends adapted to engage the opposite clutch members 62 and 63 carried upon the steering shaft 64 and upon the tower raising shaft 65 respectively. No mechanism has been shown for shifting these clutches into and out of engagement but as such mechanism is well known, it is hardly thought necessary to enter into a description of the same herein. The steering shaft 64 is provided intermediate its length with a worm 66 which is adapted to engage a worm segment 67 formed on the lower member 7 of the fifth wheel so that when the clutch 60—62 is in engagement and the engine 54 rotated in the proper direction (and it must be understood that said engine is reversible), the truck 8 will be turned in the proper direction. When the clutch 60—62 is thrown out of engagement and the clutch 61—63 is thrown into engagement, the tower raising shaft will be operated so that the worm 68 will work in the worm gear 69 and rotate the shaft 70 which is connected to said gear and which carries the cable drums 71.

A conventional form of sliding tower has been particularly shown herein which comprises a section 72 secured to the frame of the vehicle and a section 73 slidably mounted therein and having a platform 74 mounted upon its upper end. The section 72 carries suitable pulleys 75 over which the cable 76 from the drums is adapted to pass, the lower end of the cable being of course connected to the lower portion of the section 73.

The gear 69 is preferably slidably mounted upon the shaft 70 so that it may be slipped to permit the operation of the drums by hand and in order to accomplish this the opposite end of the shaft is provided with a squared end 77 to receive a crank and a ratchet wheel 78 is mounted upon the shaft and adapted to be engaged by the pawl 79 pivoted to the channel iron sill adjacent the same.

The members of the fifth wheel are connected together by suitable clips or ears 80 and the axle and driving shaft are braced by means of struts 81 which extend from the depending arms 11 to the axle. A suitable boiler 82 is shown and water tanks 83 mounted beneath the bed 1 in such a manner as to be out of the way and to permit the bed plate to be free for the reception of tools, repairing paraphernalia and the like, the fuel tank 84 being mounted beneath the seat. The throttle controlling levers for the main and auxiliary engines may be mounted upon the steering post or any other convenient point and the reverse levers for the engine may be in the form of foot pedals as is now commonly practised in automobile construction. These points being immaterial and of no import as regards the features of the invention, have not been illustrated or described in detail herein but it is to be understood that such controlling levers are suitably connected with the engines in practice and all necessary additions are contemplated to make the device an operative one.

Having thus described the invention, what is claimed is—

1. A wagon body, a truck pivotally connected thereto a vertical shaft concentric with the pivot connection between the body and the truck, a sleeve on said shaft, a second sleeve on the first-named sleeve having a spur gear and a beveled gear, a steering shaft mounted on the body and having a pinion engaging said spur gear, driving spindles mounted on the truck, steering spindles pivotally mounted on the truck, connected together for simultaneous movement and one provided with an arm, axle spindles having their bearings in the steering spindles and flexibly connected to and driven by said driving spindles, a gear connecting said driving spindles to the driving shaft, a motor connected to said gear shaft, a vertically arranged beveled gear carried by the truck and engaged by the beveled gear of the second sleeve, a shifter rod pivotally connected to the vertically arranged beveled gear and to the arm of one of the steering spindles, and means to turn the said truck pivotally so that the steering spindle may be turned either with or independent of the truck.

2. A wagon body, a spring truck pivotally connected thereto, a longitudinally extensible vertical shaft concentric with the pivot connection between the body and truck, a sleeve on said shaft, a second sleeve on the first-named sleeve and having a spur gear and a beveled gear, a steering shaft mounted on the body and having a pinion engaging said spur gear, driving spindles mounted on the truck, steering spindles pivotally mounted on the truck and connected together for simultaneous movement and one provided with an arm, axle spindles having their bearings in the steering spindle and flexibly connected to and driven by said driving spindles, gears connecting said driving spindles to the driving shaft, a motor geared to said shaft, a vertically arranged beveled gear carried by the truck and engaged with the beveled gear of the second sleeve, a shifter rod pivotally connected to the vertically arranged bevel gear and to the arm of one of the steering spindles and means to turn said truck pivotally so that the steering spindle may be turned either with or independently of the truck.

In testimony whereof I affix my signature in presence of two witnesses.

WILLIAM V. YANDELL.

Witnesses:
  JAMES A. MILNE,
  MATTIE V. HANN.